Sept. 21, 1954

G. R. PIPES 2,689,770

VEHICLE WHEEL COVER

Filed March 19, 1952

INVENTOR.
GEORGE R. PIPES
BY Hudson, Boughton,
Williams, David & Hoffmann.
ATTORNEYS Patented Sept. 21, 1954

2,689,770

UNITED STATES PATENT OFFICE 2,689,770

VEHICLE WHEEL COVER

George R. Pipes, Mayfield Heights, Ohio, assignor to Eaton Manufacturing Company, Cleveland, Ohio, a corporation of Ohio Application March 19, 1952, Serial No. 277,388

14 Claims. (Cl. 301—37)

This invention relates to covers of the kind intended for detachable mounting on vehicle wheels and which, in the applied position, extend over a substantial portion of the front or outer side of the wheels and serve both as a protective shield and as an ornamental trim device.

An object of the present invention is to provide an improved wheel cover of this character comprising a circular front cover member and a rear sheet metal ring member adapted for telescoping cooperation with a vehicle wheel and carrying a wire ring having retaining elements engageable with the wheel, and in which the wire ring is mounted on the ring member in a novel manner.

Another object is to provide an improved construction for a wheel cover of the character mentioned above in which the sheet metal ring member has an annular series of openings and intervening web portions, and in which the wire ring is mounted on the ring member by engagement in annularly aligned recessed seats formed in such web portions.

As a further object this invention provides an improved construction for a wheel cover of the kind above referred to in which fins formed by metal deflected from the openings of the sheet metal ring member define blades for facilitating a circulation of air relative to the wheel, and in which such blades extend across the recessed seats and retain the wire ring therein.

Additionally, this invention provides an improved construction for a wheel cover of the bladed ventilating type mentioned above in which the inner end of the sheet metal ring member defines seat means engageable in an annular crevice of the wheel for holding the peripheral rim of the cover in spaced relation to the wheel for a flow of cooling air therebetween.

The invention can be further briefly summarized as consisting in certain novel combinations and arrangements of parts hereinafter described and particularly set out in the claims hereof.

In the accompanying sheet of drawings.

Figure 1:
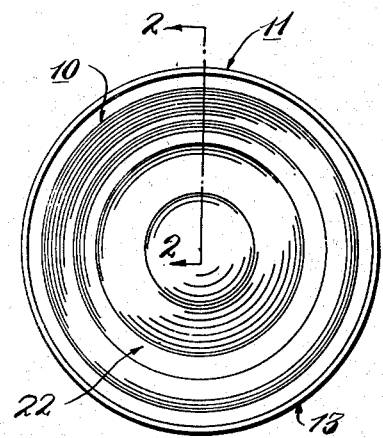
Fig. 1 is a front elevation showing a wheel cover applied to a vehicle wheel and embodying the present invention.

As representing one practical embodiment of this invention, the drawing shows an ornamental trim device or wheel cover 10 of the kind intended for use on a vehicle wheel 11. The trim device 10 is hereinafter referred to simply as a wheel cover although this device serves both as a trim device for ornamenting a vehicle wheel and a shield for protecting the wheel structure and associated mechanism from salt, dirt and other road substances likely to be encountered. The cover 10 is detachably connected with the wheel 11 and in its applied position extends over a substantial portion of the front or outer side of the wheel.

The wheel 11 is here shown as being of the kind intended to be equipped with a pneumatic tire and comprises a dished cylindrical body member 12 and an annular rim member 13 connected with such body member and extending therearound. The rim member 13 comprises a channel-shaped metal member defining an outwardly opening annular channel 14 for the mounting of the pneumatic tire therein. For this purpose the rim member 13 comprises front and rear radial flanges 15 and 16, and an intermediate drop-center portion 17 having a substantially flat annular bottom wall 17a. The rim member 13 also comprises a tire bead seating portion for the front annular bead of the tire and which provides on the rim member an internal annular hump or shoulder 19 and an internal annular groove 20 located axially rearwardly of, but immediately adjacent to, this internal annular shoulder. At the point of attachment of the body member 12 to the bottom wall 17a of the drop-center portion 17, the body and rim members define an axially forwardly opening annular crevice 21.

The wheel cover 10 comprises in general a circular sheet metal front cover member 22, a sheet metal ring member 23 connected with the front cover member and extending rearwardly therefrom, and a wire ring 24 mounted on the sheet metal ring member and carrying an annular series of circumferentially spaced retaining elements 25 adapted for holding engagement in the internal annular groove 20 of the vehicle wheel 11 when the cover is applied thereto.

The cover member 22 is here shown as being a centrally forwardly dished substantially circular disk member of a diameter to extend over a substantial portion of the front side of the wheel 11. In this instance the disk member 22 is of a diameter such that its peripheral edge lies adjacent to and overlaps the front radial flange 15 of the rim member 13. The disk member 22 can be provided with any desired ornamentation and is here shown as having one or more annular ribs or corrugations 26 surrounding the forwardly dished central portion 22a. The peripheral edge of the disk member 22 is provided with an integrally formed annular bead 27.

The sheet metal ring member 23 comprises a substantially radially extending front annular flange 28, an annular intermediate portion 29 and an annular rear bead 30. The ring member 23 is connected with the disk member 22 by engagement of the radial flange 28 in the annular bead 27 of the disk member. The annular intermediate portion 29 is formed by a pair of contiguous interrupted annular web portions 31 and 32. The interrupted annular web portion 31 is connected with and located immediately rearwardly of the front radial flange 28 and slopes rearwardly and inwardly relative to the axis of the wheel 11. The interrupted annular web portion 32 is integrally connected with and constitutes an extension of the interrupted annular web portion 31 and extends rearwardly and inwardly in converging relation to the axis of the wheel 11 but at a different angle than the web portion 31, such that these two interrupted annular web portions define therebetween a radially inwardly facing annularly extending included angle 33 which is here shown as being somewhat greater than a right angle.

The annular rear bead 30 of the sheet metal ring member 23 comprises an integral rearward extension of the annular intermediate portion 29. The bead 30 is here shown as being a hollow bead formed by integrally connected annularly extending top and bottom flat rim portions 34 and 35. This annular bead 30 forms a seat means on the cover 10 which engages in the annular crevice 21 when the cover is applied to the wheel 11.

Figure 2:
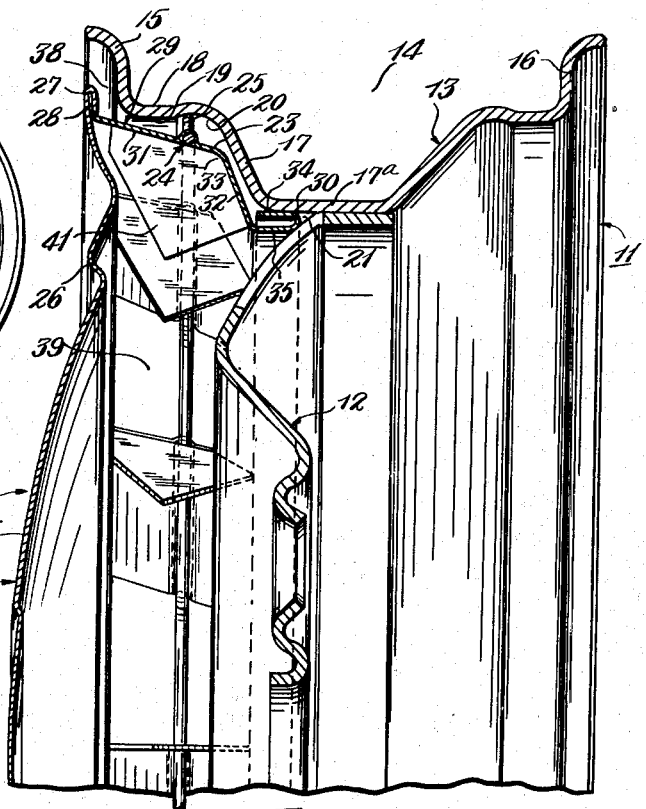
Fig. 2 is a partial vertical section on a larger scale and taken through the cover and wheel of Fig. 1 substantially as indicated by section line 2—2.

The ring member 23 is of an axial length such that when the annular bead 30 is engaged in the crevice 21, as shown in Fig. 2, the peripheral rim or bead 27 of the cover will be held in spaced relation to the front radial flange 15 of the rim member 13 to define the annular air space or passage 38 between the cover and the rim member. The flat rim portion 34 of the bead 30 also forms an annular surface which has a telescoping and guiding engagement within the portion of the wheel defined by the flat annular bottom wall 17a of the drop-center portion 17 of the rim member 13.

The annular intermediate portion 29 of the ring member 23 is interrupted at numerous circumferentially spaced points by openings 39 formed therein and which extend through the annular web portions 31 and 32. The openings 39 are here shown as being generally quadrangular in shape and extending for the full or major portion of the axial distance between the front radial flange 28 and the rear bead 30. The intervening portions of the intermediate portion 29 which are intercepted by the openings 39, define axially and inwardly extending substantially flat arms 40 between the pairs of these openings. Each of the arms 40 thus comprises an intercepted portion of the annular web portion 31 and an intercepted portion of the annular web portion 32. Thus, in a sense, the intermediate portion 29 of the ring member 23 can also be referred to as comprising an annular series of these axially and inwardly extending substantially flat arms 40.

The ring member 23 is also provided with an annular series of circumferentially spaced fins 41 extending substantially radially inwardly from the annular intermediate portion 29 and defining a group of blades on the cover 10 adjacent the peripheral rim thereof and also adjacent the air passage 38 when the cover has been applied to the vehicle wheel 11. These blades act as heat radiating fins for dissipating heat from the vehicle wheel 11 and also act as air impeller blades to facilitate a flow of cooling air through the annular passage 38.

Figure 4:
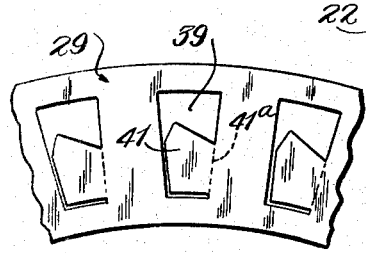
Fig. 4 is a partial plan view illustrating the shape of a flat blank from which the sheet metal ring member can be formed.
Figure 3:
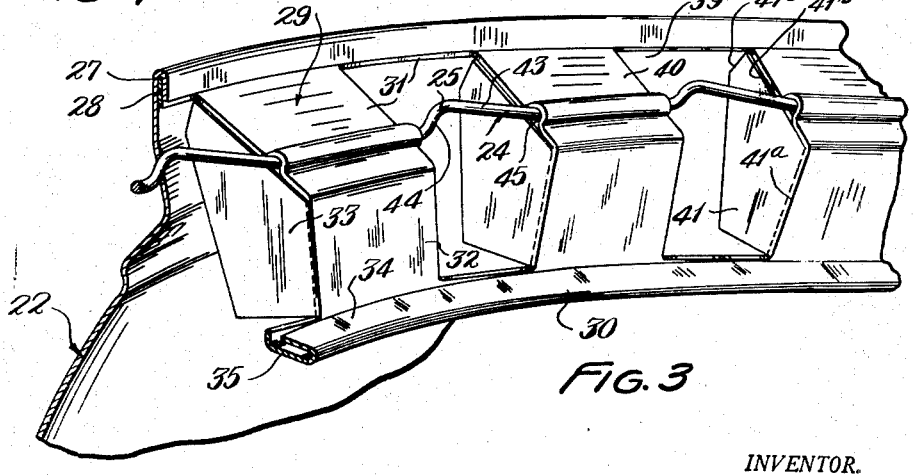
Fig. 3 is a partial top and rear perspective view of the cover showing the same detached from the wheel and further illustrating the novel cover construction.

The blades 41 are formed from metal displaced from the openings 39 of the ring member 23 by deflecting such metal to the substantially radial position shown in Fig. 3. In forming these blades, only a portion of the metal from the openings 39 need be used. The web elements from these openings are preferably sheared to the shape shown in Fig. 4, such that when these elements have been bent to the radial position shown in Fig. 3 they remain connected along the edge 41a thereof with the annular web portion 32, that is to say, they remain connected with the individual arms 40. The blades 41 are here shown as being in the shape of an irregular pentagon having the connected edge 41a as one of its sides. An adjacent side 41b lies adjacent to and extends axially along an edge of the portion of the arm 40 which is formed by one of the intercepted portions of the interrupted annular web portion 31. The edges 41c of the blades 41 engage or lie near the rear side of the disk member 22 adjacent the peripheral bead 27 thereof.

From the construction and arrangement just described above for the ring member 23 it will be seen that the arms 40 thereof are of an axially arched shape and are disposed with the arch recess thereof facing inwardly, that is, toward the axis of the wheel 11. The blades 41 are all located at the same side edge of the arms 40 and the edges 41a and 41b of these blades define an angular shape which conforms to the arch curvature of these arms. The openings 39 of the ring member 23 form passages for air being impelled by the blades 41 and which moves through the passage 38.

The ring 24 is formed of resiliently flexible wire, such as piano wire, and is mounted on the sheet metal ring member 23 so as to extend annularly therearound. The wire ring 24 extends annularly across the arms 40 and spans the openings 39. The retaining elements 25 which are carried by the wire ring 24 are located at the openings 39 and project substantially radially from the ring member 23 by extending through these openings.

The retaining elements 25 are preferably formed by bent portions of the wire ring 24. In this instance the retaining elements 25 are defined by a pair of relatively long and short angularly disposed arm portions 43 and 44 of the wire ring 24. The portion of the wire ring forming the junction between these long and short arm portions, defines a convexly rounded shape for the retaining elements 25 which enables these elements to slidingly ride over the internal annular projection 19 of the rim member 13 when the cover 10 is being applied to or removed from the vehicle wheel 11.

When the cover 10 has been fully applied to the wheel 11, such that the bead 30 of the ring member 23 has been seated in the annular crevice 21, the retaining elements 25 will extend into the internal annular groove 20 of the rim member and their engagement with the rim member inwardly of the annular shoulder 19 will retain the cover on the vehicle wheel. The resilient character of the wire ring 24 permits a sufficient flexing of the portions 43 and 44 of the wire ring to enable the retaining elements 25 to ride over the internal annular projection 19 and spring outwardly into the internal annular recess 20.

The wire ring 24 is mounted on the sheet metal ring member 23 by engagement of the wire ring in recessed or concave seats defined by hollow beads or ribs 45 formed on the ring member and which seats are here shown as being grooves extending across the arms 40 on the underside thereof, that is to say, on the side such that the grooves have their openings facing toward the axis of the vehicle wheel 11. The grooves are of a transverse size and shape to snugly receive the wire ring 24 with the bent portions of the wire ring which define the holding members 25 extending substantially radially outwardly of the cover through the openings 39. The wire ring 24 is retained in the groves 45 by the blades 41 and particularly by the edges 41b of these blades which extend in bridging relation across the grooves of the respective arms 40.

From the foregoing description and the accompanying drawing it will now be readily understood that this invention provides a trim device or wheel cover which is formed of a relatively small number of parts and which will be strong and durable and will be securely held in place on the vehicle wheel when applied thereto, but still permitting removal of the cover whenever this should be desirable, by the simple application of a suitable prying force. It will now also be seen that with the construction above described for the sheet metal ring member and the wire ring of the cover, the cooling blades can be formed by metal deflected from the openings of the ring member and the wire ring can be mounted on the cover by engagement in grooves provided in the ring member. Additionally, it will be seen that with the above described construction the blades of the ring member also form a holding or locking means by which the wire ring is retained in its assembled position in the grooves of the ring member.

Although the wheel cover of this invention has been illustrated and described herein to a somewhat detailed extent, it will be understood of course that the invention is not to be regarded as being limited correspondingly in scope but includes all changes and modifications coming within the terms of the claims hereof.

Having thus described my invention, I claim:

1. A wheel trim device comprising a substantially circular outer member, a ring member connected with said outer member and extending generally axially rearwardly therefrom, said ring member having a series of circumferentially spaced openings therein separated by intervening portions of said ring member, said intervening portions having substantially annularly aligned grooves formed therein, a wire ring carried by said ring member and engaged in said grooves, retaining elements carried by said wire ring and projecting from said ring member for holding engagement with the wheel when the trim device is applied thereto, means carried by said ring member and extending in bridging relation to said grooves and effective to retain said wire ring therein, and means spaced axially rearwardly from said retaining elements and defining a rear end bead on said ring member adapted to engage said wheel annularly thereof.

2. A wheel cover comprising, a sheet metal disk member, a sheet metal ring member connected with said disk member and extending generally rearwardly therefrom, said ring member having a series of circumferentially spaced openings therein, hollow bead means formed on said ring member and extending annularly therearound and interrupted at spaced points by said openings, said hollow bead means defining substantially annularly aligned radially inwardly opening concave seats, a resilient wire ring carried by said ring member and engaged in said concave seats, retaining elements carried by said wire ring and projecting substantially radially from said ring member at the locations of said openings, and means formed by deflected portions of said ring member and extending across said concave seats and effective to retain said wire ring therein.

3. A wheel cover as defined in claim 2 in which said deflected portions of said ring member define substantially radial blades on said cover.

4. A wheel cover comprising, a front disk member, a sheet metal ring member projecting from the rear side of said disk member and having a pair of integrally connected interrupted annular web portions disposed in a relatively inclined angular relation defining a radially inwardly facing included angle, said ring member having openings at annularly spaced points and interrupting said web portions, one of said web portions having hollow bead means thereon defining substantially annularly aligned inwardly opening concave seats, a wire ring carried by said ring member and engaged in said concave seats, retaining elements carried by said wire ring and projecting substantially radially from said ring member at the locations of said openings, and blades integrally connected with the other of said web portions and formed by metal deflected from said openings, said blades extending across said concave seats and retaining said wire ring therein.

5. A wheel cover comprising, a front disk member, a sheet metal ring member projecting from the rear side of said disk member and having a pair of integrally connected interrupted annular web portions disposed in a relatively inclined angular relation defining an inwardly facing included angle, said ring member having openings at annularly spaced points and interrupting said web portions, one of said web portions having hollow bead means thereon defining substantially annularly aligned inwardly opening concave seats, a wire ring carried by said ring member and engaged in said concave seats, retaining elements carried by said wire ring and projecting substantially radially from said ring member at the locations of said openings, and a group of annularly spaced substantially radial blades formed by metal deflected from said ring member in the forming of said openings, said blades being integrally connected at one edge thereof with the other of said web portions and extending edgewise across said concave seats and retaining said wire ring in the latter.

6. A wheel cover or the like comprising, a sheet metal front disk member having a peripheral bead thereon, a one-piece sheet metal ring member comprising a substantially radially extending front end flange and an annular rear end bead and an annular series of circumferentially spaced axial arms integrally connecting said end flange and said end bead, said ring member projecting rearwardly from said disk member and being connected therewith by engagement of said end flange in said peripheral bead, said arms having substantially annularly aligned concave seats formed therein, a wire ring carried by said ring member and engaging in said concave seats, said wire ring having bent portions at annularly spaced points defining resiliently yieldable retaining elements engageable with a wheel when the cover is applied thereto, and blades connected with said arms and formed by portions of said ring member deflected to a substantially radial position extending across said concave seats and retaining said wire ring in the latter.

7. A wheel cover as defined in claim 6 in which said axial arms are substantially flat and said concave seats are in the form of grooves extending across said arms in substantially annularly aligned relation around said ring member.

8. A wheel cover for use on a vehicle wheel of the type having connected body and rim members with an annular crevice therebetween and an adjacent internal annular projection defined by a tire bead receiving portion of the rim member, comprising a front disk member, a ring member extending generally axially rearwardly from said disk member and having its front end connected with the latter, bead means on the rear end of said ring member and defining annular seat means engageable in said crevice, said ring member having circumferentially spaced openings therein and being of an axial length to hold the rim portion of the cover spaced from said rim member for defining an air passage therebetween when said seat means is engaged in said crevice, a wire ring connected with said ring member and having circumferentially spaced radially projecting resilient retaining elements formed by bent portions of the wire ring and engageable behind said annular projection, and a series of annularly spaced blades connected with said ring member and formed by metal deflected from said ring member in the forming of said openings.

9. A wheel cover for use on a vehicle wheel of the type having connected body and rim members with an annular crevice therebetween and an adjacent internal annular projection defined by a tire bead receiving portion of the rim member, comprising a front disk member, a ring member extending generally axially rearwardly from said disk member and having its front end connected with the latter, bead means on the rear end of said ring member and defining annular seat means engageable in said crevice, said ring member having circumferentially spaced openings therein and intervening axially arched substantially flat arm portions and being of an axial length to hold the rim portion of the cover spaced from said rim member for defining an air passage therebetween when said seat means is engaged in said crevice, said arm portions having grooves formed therein and extending thereacross annularly of said ring member, a resilient wire ring engaging in said grooves and extending across said openings and having bent portions forming retaining elements at the locations of said openings and engageable behind said annular projection, and a series of annularly spaced blades formed by metal deflected from said ring member in the forming of said openings and extending edgewise across said grooves and retaining said wire ring in the latter.

10. A wheel cover as defined in claim 9 in which said blades have a convex edge contour substantially coincident with the arch contour of said arm portions and in which said blades are integrally connected with said arm portions along at least a portion of said arch contour.

11. A wheel cover for use on a vehicle wheel of the type having connected body and rim members defining an annular crevice and also having an internal annular projection defined by a tire bead seating portion of the rim member and a substantially flat internal annular surface contiguous to said crevice and defined by a drop-center portion of said rim member, comprising a front disk member, a ring member extending generally axially rearwardly from said disk member and having its front end connected with the latter, bead means on the rear end of said ring member and defining annular seat means engageable in said crevice, said ring member having circumferentially spaced openings therein and intervening axially arched substantially flat arm portions and being of an axial length to hold the rim portion of the cover spaced from said rim member for defining an air passage therebetween when said seat means is engaged in said crevice, said arm portions having grooves formed therein and extending thereacross annularly of said ring member, a resilient wire ring engaging in said grooves and extending across said openings and having bent portions forming retaining elements at the locations of said openings and engageable behind said annular projection, and a series of annularly spaced blades formed by metal deflected from said ring member in the forming of said openings and extending edgewise across said grooves and retaining said wire ring in the latter, said bead means also defining a substantially flat external annular surface of a diameter for guided telescoping engagement within said flat internal annular surface.

12. A wheel trim device comprising a substantially circular outer member, a ring member connected with said outer member and extending generally axially rearwardly therefrom, said ring member having a series of circumferentially spaced openings therein separated by intervening portions of said ring member, said intervening portions having substantially annularly aligned grooves formed therein, a wire ring carried by said ring member and engaged in said grooves with portions of the wire ring spanning said openings, retaining elements carried by the spanning portions of said wire ring and projecting from said ring member substantially at the locations of said openings for holding engagement with the wheel when the trim device is applied thereto, and means carried by said ring member and extending in bridging relation to said grooves and effective to retain said wire ring therein, said ring member having an annularly continuous portion located axially rearwardly of said openings and defining a substantially annularly continuous end bead adapted to engage said wheel annularly thereof at a location axially rearwardly offset from the engagement of said retaining elements with the wheel.

13. A wheel trim device as defined in claim 12 in which said annularly continuous bead is also offset radially inwardly relative to said wire ring.

14. A trim device as defined in claim 12 in which the means extending in bridging relation to said grooves comprises portions of said ring member which have been displaced from said openings.

References Cited in the file of this patent

UNITED STATES PATENTS

| Number | Name | Date |
|---|---|---|
| 1,817,194 | Hunt | Aug. 4, 1931 |

FOREIGN PATENTS

| Number | Country | Date |
|---|---|---|
| 812,968 | France | May 21, 1937 |